United States Patent [19]

Pinney

[11] 3,960,820

[45] June 1, 1976

[54] REGULATING THE FLOW OF MOLTEN POLYAMIDES IN A CONTINUOUS PROCESS FOR THE PREPARATION THEREOF

[75] Inventor: Baden McDowall Pinney, Kingston, Canada

[73] Assignee: Du Pont of Canada Limited, Montreal, Canada

[22] Filed: Nov. 8, 1974

[21] Appl. No.: 522,111

[30] Foreign Application Priority Data

Feb. 27, 1974 Canada.................................. 193616

[52] U.S. Cl. ............................ 260/78 R; 260/78 L; 260/95 C
[51] Int. Cl.$^2$ ................... C08G 69/16; C08G 69/28
[58] Field of Search ........................ 260/78 R, 78 L

[56] References Cited
UNITED STATES PATENTS 3,193,535   7/1965   Carter............................ 260/78 R

*Primary Examiner*—Harold D. Anderson

[57] ABSTRACT

Improved control is provided in a process for the continuous preparation of a polyamide from an aqueous solution of polyamide-forming reactants, e.g., from an aqueous solution of hexamethylene diammonium adipate. The process comprises feeding continuously, the aqueous solution of polyamide-forming reactants or partially polymerized polyamide-forming reactants to an elongated tubular zone having an inlet pressure of at least 60 lb./sq. in. absolute; passing the solution through the elongated zone and gradually reducing the pressure along the zone to progressively flash water into steam while supplying sufficient heat to maintain the temperature of the solution above the melting point of the resultant polyamide; and passing the molten polyamide from the tubular zone into a finishing vessel. The improvement comprises maintaining a substantially constant level in the finishing vessel by controlling the pressure in the tubular zone and thus regulating the flow of molten polyamide from the tubular zone by injecting steam at an intermediate point in the tubular zone.

9 Claims, 1 Drawing Figure

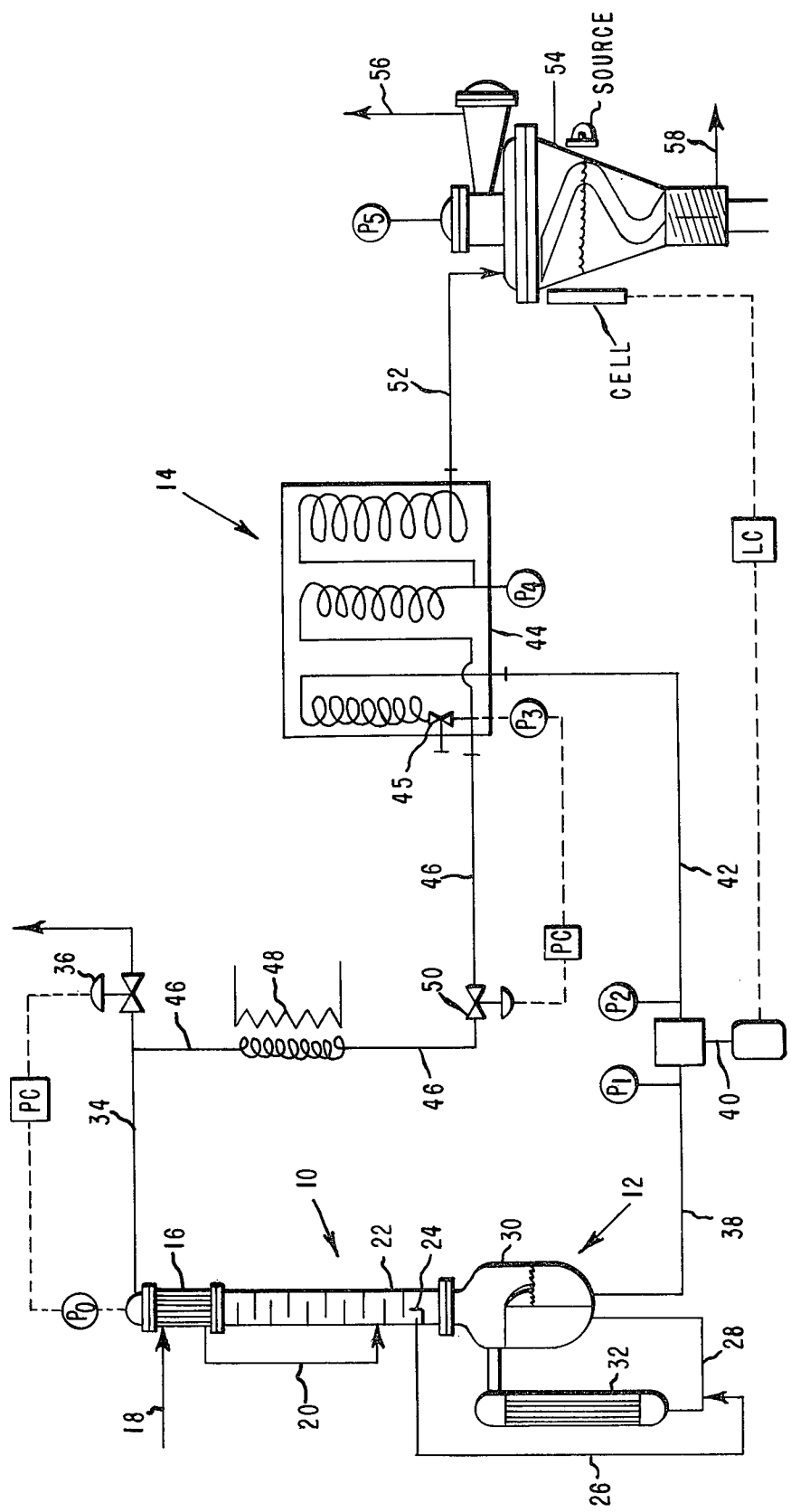

3,960,820

REGULATING THE FLOW OF MOLTEN POLYAMIDES IN A CONTINUOUS PROCESS FOR THE PREPARATION THEREOF

BACKGROUND OF THE INVENTION

This invention relates to the production of synthetic polyamides and, more particularly, to a continuous process for producing polyamides by the polymerization of polyamide-forming aqueous salt solutions.

Synthetic polyamides are important commercially, particularly those which exhibit film or fiber-forming properties. Such polyamides are the linear condensation products of diamines and dicarboxylic acids, which are usually prepared by heating an aqueous salt solution prepared from a selected diamine and a selected dicarboxylic acid, with the removal of water until the desired degree of polymerization is attained.

Film or fiber-forming polyamides may be prepared batchwise or continuously. In general, polyamides may be prepared more economically, more uniformly and with less handling by a continuous process. In some continuous processes, an aqueous solution of polyamide-forming reactant, e.g., a diaminedicarboxylic-acid salt, is supplied continuously to an elongated tube having a predetermined elevated inlet pressure, e.g., 15 atmospheres, and passed through the elongated tube wherein a temperature sufficiently high for polymerization to occur (and above the melting point of the resultant polyamide) is maintained and the pressure is gradually reduced along the tube to progressively flash water from the reaction mass as steam. Such an elongated tube is frequently referred to in the art as a "flasher". The reaction mass is then passed continuously to another heated vessel frequently referred to as a "finisher".

In other continuous processes, the aqueous solution of polyamide-forming reactants is first fed continuously to a reactor wherein the temperature and pressure conditions are such that the salt is partially polymerized before it is passed continuously through a flasher to a finisher.

In any of the above-continuous processes in which flashers are used, problems may be encountered in maintaining a substantially constant level in the vessel (finisher) which follows the flasher. These problems in maintaining substantially constant level become greater as the deviation in instantaneous "rate in" vs. "rate out" increases. This deviation in flow is caused by instabilities associated with two phase (liquid-vapor) flow in the flasher. These problems in level control (which are often present in steady state operation as a result of small fluctuations in pressure, temperature, viscosity, etc.) are aggravated by changes in throughput, such as those which occur in fiber production if one or more spinning positions are shut down or started up. In fiber production, a substantially constant level in the finisher can make the difference between a system in which it is difficult to make a product with good dye uniformity and one that is capable of consistently producing dye critical product. The reason for this is that variations in residence time in the system affect the final degree of polymerization obtained and hence the dye pick up on the dye receptive end groups in the polymer. J. A. Carter et al. in Canadian Pat. No. 800,061, issued Nov. 26, 1968, discloses a method of maintaining a substantially constant level in the vessel following the flasher during changes in monomer throughput which involves feeding a composite aqueous solution of polyamide-forming reactants to the flasher; the composite being formed from two separate streams of different concentration and the rates of flow of the two streams being varied such that the rate of introduction of water is substantially constant.

The main disadvantage of the above method for maintaining a substantially constant level in the vessel which follows the flasher are that it is cumbrous and that it is not effective in continuous processes in which the aqueous solution of polyamide-forming reactants are first fed to a vented reactor before being passed to a flasher.

Surprisingly, it has now been found that the above disadvantages of such prior art processes may be overcome and a substantially constant level in the vessel following the flasher may be maintained by controlling the pressure in the flasher by injecting steam at an intermediate point in the flasher while controlling a single feed stream to the system.

SUMMARY OF THE INVENTION

In a process for the continuous preparation of a polyamide from an aqueous solution of polyamide-forming reactants that includes the steps of, feeding continuously the aqueous solution of polyamide-forming reactants to an elongated tubular zone having an inlet pressure of at least 60 lb./sq. in. absolute, passing the solution through the elongated tubular zone and gradually reducing the pressure along the zone to progressively flash water into steam while supplying sufficient heat to maintain the temperature of the solution above the melting point of the resultant polyamide, and passing the molten polyamide from the elongated tubular zone into a vessel, the improvement for maintaining a substantially constant level in said vessel comprising: controlling the pressure in the elongated tubular zone and thus regulating the flow of molten polyamide from the tubular zone by injecting steam at an intermediate point in the tubular zone.

The aqueous solution of polyamide-forming reactants may be an aqueous solution of a salt of a diamine and a dicarboxylic acid or it may be an aqueous solution of a mixture of a salt of a diamine and a dicarboxylic acid and a lactam. The following are examples of such aqueous solutions:

1. a 40 to 60 percent by weight solution of hexamethylene diammonium adipate; and
2. a 40 to 60 percent weight solution of a mixture of hexamethylene diammonium adipate and $\epsilon$-caprolactam. In the second solution, the ratio of the weight of the hexamethylene diammonium adipate to the weight of $\epsilon$-caprolactam may be approximately four to one.

BRIEF DESCRIPTION OF THE DRAWING

A schematic flow diagram illustrating one embodiment of the invention.

DETAILED DESCRIPTION OF THE PREFERRED EMBODIMENT

Referring generally to the drawing, the continuous polymerization system includes a rectifying zone 10, an initial reaction zone 12 in which a solution of aqueous polyamide-forming reactants, for example, an aqueous solution of hexamethylene diammonium adipate, is uniformly mixed, partially vaporized and partially reacted under predetermined pressure-temperature conditions; and an elongated tubular zone 14 wherein the reaction continues with the flashing of water as steam as the pressure is reduced. The water vapor from the initial reaction zone is vented through the rectifying zone 10; a portion thereof being superheated in superheater 48 and injected through steam injection control valve 50 at an intermediate point in the elongated tubular zone 14 to control the pressure therein and the remainder thereof being vented to atmosphere through vent control valve 36. The polymer issuing from the elongated tubular zone 14 passes to a finisher 54 and from there through a transfer line 58 for further processing. For example, the polymer may be fed to polymer pelletizing, fiber spinning or film extruding units.

Referring now to the drawing in detail, a combination partial condenser-preheater 16 is shown in the upper portion of rectifying zone 10. Partial condenser-preheater 16 has an inlet line 18 and an exit line 20 which connects to the mid-portion of a rectification column 22, which has a number of bubble cap trays. A collection pan 24 is positioned below the lowest of the bubble cap trays. A liquid line 26 leads from collection pan 24 to a recirculating loop 28. The recirculating loop 28 connects the bottom of a separator 30 comprising the base-section of the rectification column 22, to the bottom of vertical thermosyphon reboiler 32. A vent line 34 with a control valve 36 is provided from the top of rectifying zone 10. An exit line 38 containing a gear pump 40 connects the bottom of separator 30 through a heated entrance line 42 to a flasher 44 (i.e., an elongated tubular zone 14). A flasher manual valve 45 is provided in the flasher about one-third of the way along the flasher. A steam injection line 46, containing a superheater 48 and steam injection control valve 50, is connected from a point in vent line 34 prior to control valve 36 to a point immediately downstream of flasher valve 45 in flasher 44. An outlet line 52 connects flasher 44 to a finisher 54 and a vent line 56 connects the top of finisher 54 to a steam ejector (not shown).

In operation, a flow of an aqueous solution of polyamide-forming reactants, for example, a 40 to 60% by weight solution of polyamide-forming salt such as hexamethylene diammonium adipate, is fed to the combination partial condenser-preheater 16 through entrance line 18. The temperature of the solution entering the partial condenser-preheater 16 is normally in the range of 25° to 50°C. and the solution is heated in the partial condenser-preheater 16 to a temperature which may approach the temperature of the vapor in the upper portion of the rectifying zone 10. The partial condenser-preheater 16 also condenses a portion of the vapor in the upper portion of rectifying zone 10 to provide reflux for the rectifying zone 10. From the partial condenser-preheater 16, the solution is fed through line 20 into a mid-section of the rectification column 22 in which it mixes with reflux and passes down the column and into collection pan 24. The solution, diluted by the reflux, flows from the collection pan 24 through the liquid line 26 and is injected or sparged into the recirculating loop 28 where it mixes with the liquid circulating in the recirculating loop 28 and passes into the bottom of the vertical thermosyphon reboiler 32. In the reboiler 32, the solution is heated, partially vaporized and partially reacted to form water vapor and an aqueous solution of partially polymerized reactants, which pass into separator 30. The water vapor rises from the separator 30 through the rectification column 22 in which the vapor is contacted with reflux and solution.

The water vapor rising from the top tray contacts the partial condenser-preheater 16 and is partially condensed to produce reflux. The uncondensed water vapor is vented from the top of column 22 through vent line 34 by control valve 36 which operates to maintain a predetermined pressure, preferably, in the range of about 160 to about 350 lb./sq. in. absolute, throughout the rectifying zone 10 and the first reaction zone 12.

The aqueous solution of partially polymerized reactants in the separator 30 is maintained at a predetermined temperature, preferably in the range of 220 to 260°C., for a predetermined hold-up time, preferably in the range of 40 to 200 minutes, and then is passed through exit line 38 to gear pump 40. Gear pump 40 meters the flow of the solution of partially polymerized reactants through heated entrance line 42 to flasher 44 (i.e., to elongated tubular zone 14). Flasher manual valve 45 is adjusted such that the pressure indication at $P_2$ on the outlet side of gear pump 40 is close to the pressure indication at $P_1$ on the inlet side of gear pump 40 in order to avoid excessive slippage of flashing in gear pump 40. Alternatively piping in the flasher may be sized so that at a specific operating condition the desired pressure can be obtained at $P_2$ with the valve 45 omitted. If it is desired to operate $P_2$ at a pressure considerably lower than $P_1$, a control valve may be substituted for the gear pump 40.

In the flasher 44, the temperature of the aqueous solution of partially polymerized reactants is gradually increased to a predetermined exit temperature, preferably in the range of 260° to 300°C., and the pressure is gradually reduced along the flasher 44 such that the aqueous solution of partially polymerized reactants is converted into polymer (polyamide) and the water is flashed into steam. Thus, two phase flow occurs in the flasher 44. This development of two phase flow leads to a condition which can be inherently unstable particularly in the downstream portion of flasher 44 where the vapor phase occupies a considerable part of the flasher volume (typically 50%). Changes which occur in the steam volume cause changes in the residence time of the liquid phase in the flasher 44 such that the exit rate from the flasher 44 does not equal the feed rate. Hence, fluctuations can occur in the exit rate from the flasher. During the fluctuations in the exit rate from the flasher 44, cyclic pressure variations occur in the flasher 44 (as seen on pressure indications $P_3$ and $P_4$). In order to overcome these pressure fluctuations within the flasher 44, a portion of the uncondensed water vapor being vented from the top of column 22 is superheated in superheater 48 and passed through steam injection control valve 50 to a point in flasher 44 immediately downstream of flasher valve 45. Steam injection control valve 50 is operated automatically for adjustment of steam flow to maintain pressure $P_3$ at a predetermined pressure, preferably in the range of 60 to 250 lbs./sq. in. absolute. Maintaining pressure $P_3$ at a predetermined value automatically stabilizes the exit rate from the flasher 44 and allows the level in finisher 54 (downstream) to be closely controlled. It will be appreciated that any uncontaminated source of superheated steam may be used for steam injection in place of the superheated water vapor from the top of column 22.

From flasher 44, the polymer and water vapor are conducted by outlet line 52 into the finisher 54 which is operated at a predetermined pressure, preferably in the range of from 100 mm. of Hg absolute to atmospheric pressure. The vent line 56 carries the steam from the top of finisher 54 through a steam ejector (not shown) to atmosphere. The polymer leaving the finisher 54 passes through the transfer line 58 for further processing.

In the process shown in the drawing, a predetermined flow of polymer is withdrawn from finisher 54 through transfer line 58. A level controller maintains the level desired in finisher 54 by adjusting the speed of gear pump 40. A level controller (not shown) may by used to maintain the level desired in separator 30 by adjusting the flow of the polyamide-forming aqueous salt solution through entrance line 18 to the partial condenser-preheater 16. The facilities shown in the rectifying zone 10 and the initial reaction zone 12 are of the type described by Jaswal and Pugi in copending U.S. Patent application Ser. No. 392,511, filed Aug. 29, 1973; and the finisher shown is of the type disclosed by Pinney in U.S. Pat. No. 3,717,330, issued February 20, 1973. It will be appreciated that other types of initial reactors well known in the art and that other types of finishers, such as the type shown by Li in U.S. Pat. No. 3,113,843, issued Dec. 10, 1963, may be used in the process of the present invention. In such cases, however, it may be necessary to provide a source of steam other than from the rectification column 22 for injection into the flasher 44 to control the pressure therein. It will also be appreciated that an initial reactor is not required for the process of the present invention if an elongated tubular zone (i.e., a flasher) of the type disclosed by Carter et al. in Canadian Pat. No. 800,061, issued Nov. 26, 1968, is used. In this case, a level controller may be used to maintain the level desired in the finisher by adjusting the flow of polyamide-forming aqueous salt solution to the elongated tubular zone (flasher) and the pressure in the tubular zone may be controlled by injecting superheated steam at an intermediate point in the tubular zone, preferably, at a point in the upstream half of said tubular zone.

The following example illustrates the present invention without limiting its scope:

EXAMPLE

A nylon polymer was prepared continuously from an approximately 50% by weight solution of hexamethylene diammonium adipate in facilities as hereinbefore described and illustrated in the drawing.

An approximately 50% by weight solution of hexamethylene diammonium adipate was fed continuously to the continuous polymerization system through entrance line 18 in partial condenser-preheater 16. The system was then lined out and operated under the best operating conditions which could be achieved without the injection of steam to the flasher 44. Under these conditions: (1) the polymer was being removed from the finisher at a predetermined rate through transfer line 58; (2) the level in the finisher 54 was being controlled by a level controller which adjusted the speed of gear pump 40; (3) the level in separator 30 was being controlled by a level controller which adjusted the flow of the feed solution to the system and (4) no steam was being injected into the flasher 44. The operating parameters were as follows:

| Flow rates | |
|---|---|
| Feed solution to system | 210 lb./hr. (cycling) |
| Polymer from Finisher 54 | 90 lb./hr. |
| Pressure Indications | |
| At top of rectifying zone — $P_0$ | 250 lb./sq. in. absolute |
| At inlet to gear pump — $P_1$ | 250 lb./sq. in. absolute |
| In flasher immediately downstream of flasher manual valve 45 — $P_3$ | 150 ± 15 lb./sq. in. absolute (cycling over a range of 30 lb./sq. in. every 12 minutes). |
| In flasher — $P_4$ | 130 ± 15 lb./sq. in. absolute (cycling over a range of 30 lb./sq. in. every 12 minutes). |
| In finisher — $P_5$ | 500 mm. of Hg. |
| Level Indications | |
| In separator | — approx. 24 ± 3.5% |
| In finisher | — approx. 35 ± 3.5% (cycling over a range of 7% every 12 minutes and drifting). For control, a wide proportioned band setting of 300% was required |

A portion of the water vapor being vented from the rectifying zone 10 was then superheated in superheater 48 and injected through steam injection line 46 by steam injection control valve 50 to a point adjacent to pressure indicator $P_3$ in the flasher 44. The pressure controller was set to control $P_3$ at 150 lb./sq. in. absolute.

Slightly more than one hour after the steam injection was commenced (following some adjustments to the pressure controller), the pressure cycles at $P_3$ and $P_4$ were completely eliminated. The range of the level cycles in the finisher was quickly attenuated to 3% without adjustment to the level controller. The reduction in process lag, brought about by the steam injection to control the pressure at $P_3$, permitted the proportional control band of the level controller to be tightened from 300% to 30%. Thus, the range of the level cycles in the finisher was further reduced to 1% and the drifting of the level was eliminated.

With steam being injected into the flasher to control the pressure according to the present invention, abrupt increases or decreases in the order to 20% in the rate at which polymer was being withdrawn from the finisher did not upset the process as the level controllers were able to adjust rapidly to the changes.

What is claimed is:

1. In a process for the continuous preparation of aliphatic polycarbonamide from an aqueous solution of aliphatic polycarbonamide -forming reactants that includes the steps of, feeding continuously the aqueous solution of aliphatic polycarbonamide -forming reactants to an elongated tubular zone having an inlet pressure of from about 60 lb./sq. in. absolute to about 250 lb./sq. in. absolute, passing the solution through the elongated tubular zone and gradually reducing the pressure along the zone to progressively flash water into steam while supplying sufficient heat to maintain the temperature of the solution above the melting point of the resultant aliphatic polycarbonamide, said pressure in said zone cycling above and below a set point, and passing the molten aliphatic polycarbonamide from the elongated tubular zone into a vessel, the improvement for maintaining a substantially constant level in said vessel comprising: injecting steam at an intermediate point in the tubular zone according to the pressure in said tubular zone with respect to said set point whereby said cycling above and below said set point is substantially eliminated thus regulating the flow of molten aliphatic polycarbonamide from the tubular zone.

2. The process of claim 1, including a preliminary step of partially polymerizing the aqueous solution of reactants in an initial reaction zone by heating the solution of reactants at a temperature of from about 220°C to about 260°C for a period of time of from about 40 minutes to about 200 minutes.

3. The process of claim 2, including the step of restricting the flow of the aqueous solution of reactants in the elongated tubular zone.

4. The process of claim 3, wherein the steam is injected in the tubular zone immediately downstream of the flow restricting step.

5. The process of claim 4, wherein the aqueous solution of reactants is heated and uniformly mixed within the initial reaction zone for a predetermined hold-up time and at a predetermined elevated temperature and pressure to form water vapor and an aqueous solution of partially-polymerized reactants, the water vapor being vented through a rectifying zone and the aqueous solution of partially-polymerized reactants being passed to the elongated tubular zone.

6. The process of claim 5, wherein a portion of the water vapor vented from the rectifying zone is superheated and injected as steam in the tubular zone.

7. The process of claim 6, wherein the aqueous solution of partially-polymerized reactants is pumped to the elongated tubular zone at a rate regulated by the level of the molten polyamide in the vessel.

8. The process of claim 1, wherein the aqueous solution of reactants is a 40 to 60% by weight solution of hexamethylene diammonium adipate.

9. The process of claim 1, wherein the aqueous solution of reactants is a 40 to 60% by weight solution of a mixture of hexamethylene diammonium adipate and ε-caprolactam.

* * * * *